HIGH TEMPERATURE THERMOCOUPLE ALLOY SYSTEMS

Original Filed Dec. 21, 1966

United States Patent Office 3,817,793

Patented June 18, 1974

3,817,793

HIGH TEMPERATURE THERMOCOUPLE ALLOY SYSTEMS

William C. Kuhlman and Carl S. Wukusick, Cincinnati, Ohio, assignors to the United States of America as represented by the United States Atomic Energy Commission Original application Dec. 21, 1966, Ser. No. 603,694, now abandoned. Divided and this application Nov. 19, 1968, Ser. No. 802,303

Int. Cl. C22c *23/00, 27/00;* H01v *1/14*

U.S. Cl. 136—236 1 Claim

ABSTRACT OF THE DISCLOSURE

This invention relates to a thermocouple system capable of delivering a substantially linear EMF response as a function of temperature up to 1800° C. in a thermal neutron environment comprising a negative leg consisting of a chromium-base binary alloy having sufficient ductility to be drawn into wire form, said alloy selected from 15–25 atom percent ruthenium, 15–20 atom percent osmium, and the balance chromium, and a positive leg.

This is a division of application Ser. No. 603,694, filed Dec. 21, 1966, now abandoned.

The invention described herein was made in the course of, or under, a contract with the United States Atomic Energy Commission.

SUMMARY OF THE INVENTION

The present invention relates to, and it is an object of this invention to provide a thermocouple system in combination with a positive element having a large positive EMF response. Another object of the invention is to provide a thermocouple system which can deliver a linear electromotive response as a function of temperature such as is experienced in an operating nuclear reactor up to a temperature of about 1800° C.

This invention is based on the discovery that chromium-base alloys containing from 15–30 atom percent ruthenium in one case, and 15–20 atom percent osmium in another, are sufficiently ductile so that they can be drawn into wire form and display a linear EMF effect as part of a thermocouple system in which the aforementioned chromium-base alloys serve as the negative element in combination with a positive leg or element selected from molybdenum, tungsten, tungsten-base alloys containing 3–5 atom percent rhenium, and molybdenum alloyed with small amounts of ruthenium or osmium up to 5 atom percent.

Figure 1:
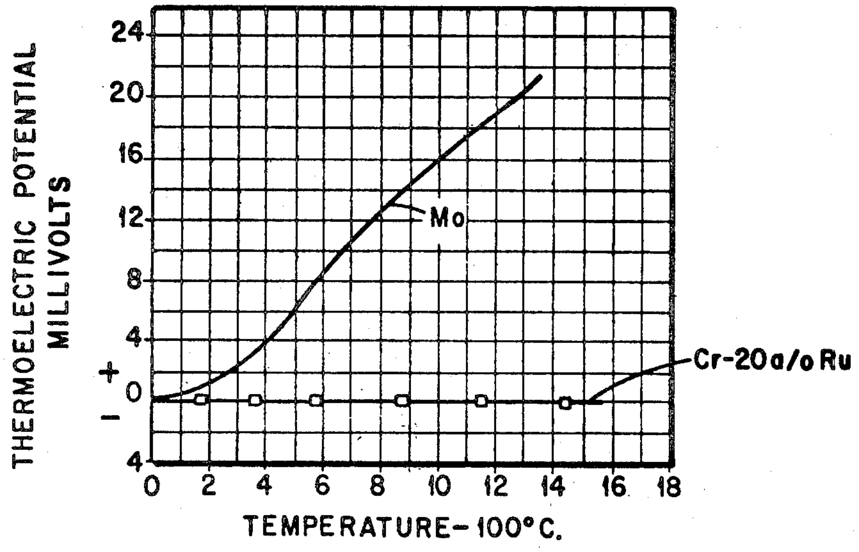
Figure 2:
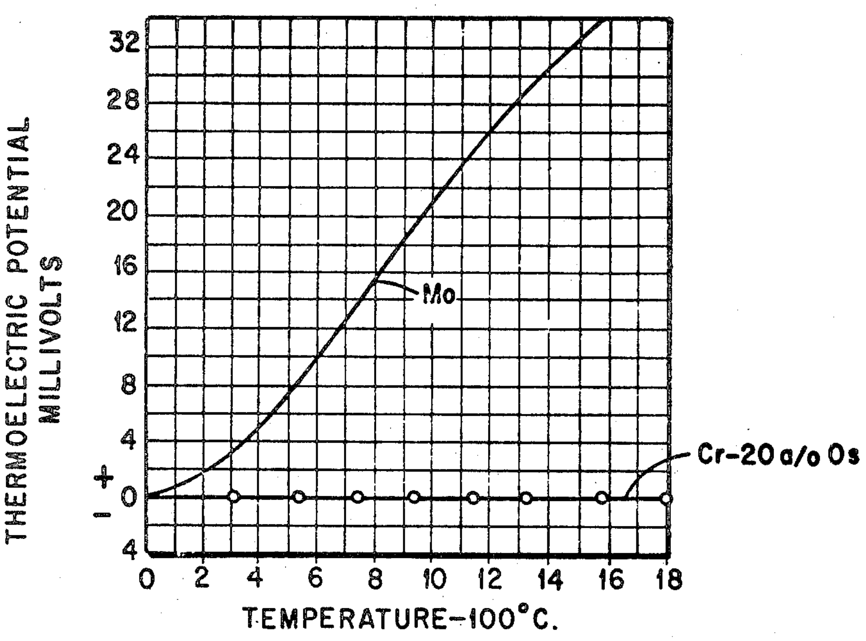

In the drawings, FIG. 1 shows the electromotive force developed by a thermocouple system consisting of a binary alloy of chromium containing 20 atom percent ruthenium as the negative leg with molybdenum serving as the positive leg. FIG. 2 shows the EMF developed from a thermocouple system consisting of a binary chromium-base alloy containing 20 atom percent osmium and a positive leg consisting of molybdenum. The curves of FIGS. 1 and 2 are normalized to show the thermoelectric power developed at various temperatures up to 1800° C. at the hot junction when the cold junction was 0° C. The slope of the curves in both instances shows the sensitivity of the thermoelectric power for any particular temperature. The increasing rapid separation of the Cr-20 Ru and Cr-20 Os curves from the molybdenum curve shows the very desirable high thermal electric sensitivity characteristic that either of these two alloys display versus molybdenum. A similar linear response will be obtained from positive thermal elements previously mentioned.

An outstanding characteristic of the aforementioned thermocouple system is its ability to produce a large, thermoelectrically sensitive thermocouple with materials of very low thermal neutron cross section.

A tungsten versus tungsten 24–26 rhenium thermocouple system has excellent thermoelectric stability in non-nuclear environment to accurately measure temperature greater than 2500° C. However, it can be shown that a positive error of approximately 100° C. may be expected in tungsten versus tungsten-rhenium thermocouple systems in a relatively short thermal neutron exposure, i.e., one month at $10^{14}$ nv. thermal neutron flux due to nuclear transmutation effect. Since the thermal nuetron cross-sections of molybdenum, chromium, ruthenium, and osmium are many times less than tungsten and rhenium, they are much less susceptible to contamination by nuclear transmutations. Hence, thermoelectric stability, which is a function of contamination, will be much improved.

Ingots of the alloys were consolidated by non-consumable electrode arc melting and casting into cylindrical ingots. The ingots were sheathed in molybdenum and hot rolled at 1000°–1200° C. down to .50 to 0.75 cm. diameter. The rods were then cold rolled and swaged to 0.19 cm. diameter wire. Intermediate annealing treatments at 900° C.–1200° C. were employed after about 30% cold work.

The positive and negative elements are then joined by tungsten inert gas welding and encapsulated in standard insulators such as $Al_2O_3$ or BeO. Prior to use each thermocouple combination should be pre-calibrated against a reference system.

While the thermocouple systems provided by this invention are particularly useful in thermal neutron environments because of their relatively low sensitivity to nuclear transmutation effects, it is obvious that they may be used with equal benefit wherever reliable temperature measurement up to 1800° C. is required. The thermocouple systems herein described and claimed should be used in inert, i.e., non-oxidizing atmospheres such as helium or argon. The Cr-Ru alloys particularly form an embrittling phase on oxidation, resulting in depletion of chromium in the base alloy and the formation of an undesirable secondary phase.

Having thus described our invention, we claim:

1. A thermocouple capable of delivering a substantially linear EMF response as a function of temperature up to 1800° C. in a thermal neutron environment consisting essentially of a first leg consisting of a chromium-base binary alloy having sufficient ductility to be drawn into wire form, said alloy selected from the group consisting essentially of 15–25 atom percent ruthenium or 15–20 atom percent osmium, balance chromium, and a second leg selected from the group consisting of molybdenum or a molybdenum-base binary alloy containing up to 5 atom percent of a metal selected from ruthenium or osmium.

References Cited

UNITED STATES PATENTS

| | | | |
|---|---|---|---|
| 2,188,405 | 1/1940 | Hensel et al. | 75—176 |
| 2,912,477 | 11/1959 | Fischer et al. | 136—236 X |
| 3,008,854 | 11/1961 | Grant | 75—176 X |
| 3,320,098 | 5/1967 | Kuhlman | 75—176 X |

OTHER REFERENCES

Research Horizons Electro-Technology, vol. 68, July 1961, pp. 11 and 12.

*Metallkunde,* vol. 48, 1957, pp. 53, 54 and 55.

CARL D. QUARFORTH, Primary Examiner

E. E. LEHMANN, Assistant Examiner

U.S. Cl. X.R.

75—176; 148—133